Nov. 2, 1954          C. F. WALSH          2,693,387
LOCKING MECHANISM FOR PIVOTALLY MOUNTED TAIL GATE
Filed April 23, 1952                    2 Sheets-Sheet 1
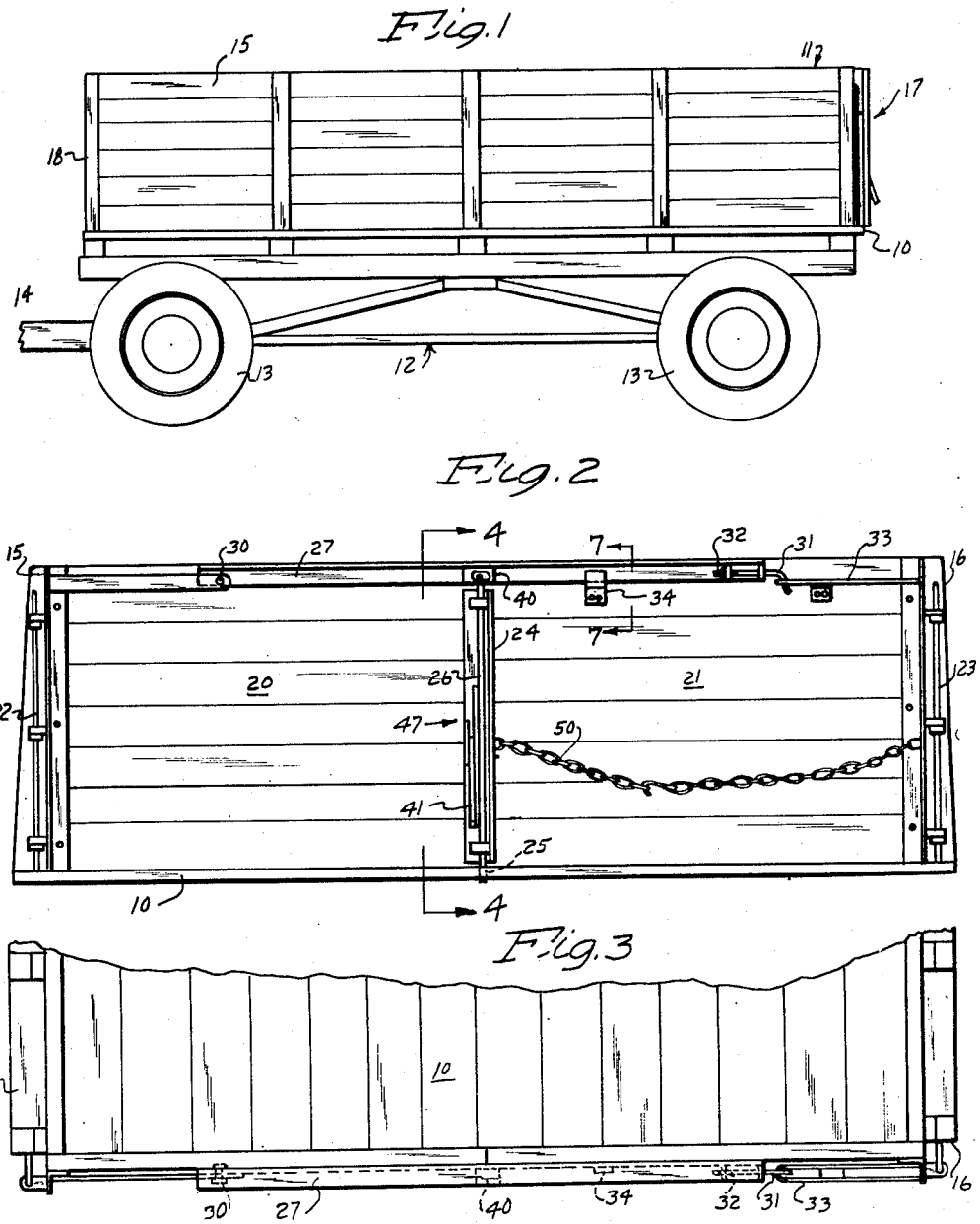
INVENTOR
CLARK F. WALSH
BY Whiteley and Caine
ATTORNEYS Nov. 2, 1954  C. F. WALSH  2,693,387
LOCKING MECHANISM FOR PIVOTALLY MOUNTED TAIL GATE
Filed April 23, 1952  2 Sheets-Sheet 2

INVENTOR
CLARK F. WALSH
BY Whitely and Caine
ATTORNEYS

United States Patent Office 2,693,387
Patented Nov. 2, 1954

2,693,387

LOCKING MECHANISM FOR PIVOTALLY MOUNTED TAIL GATE

Clark F. Walsh, Nashua, Iowa

Application April 23, 1952, Serial No. 283,893

6 Claims. (Cl. 296—50)

This invention relates to the field of agricultural implements, and more specifically to means for improving the versatility and efficiency of farm wagons.

The farm wagon is an implement of many uses, and in adapting it to the various uses to which it may be put, nothing should be done to limit its versatility in general. For example, one of the uses to which farm wagons are put is hauling long objects such as fence posts, logs, rails, etc. For this purpose it is obviously undesirable to have a limited length, and hence any tail gate should be free from permanent elements transverse of the wagon body. On the other hand, another common use for farm wagons is conveying produce to market, and for such applications it is desirable that the body be enclosed to prevent its contents from falling from the wagon.

A specific example of farm produce often hauled in such wagons is grain. It will be appreciated that for hauling grain in bulk the body of a farm wagon must be completely tight, but conventional practice places a further requirement on wagons being used for this purpose. When the grain has reached the market, ordinarily an elevator, the unloading is accomplished by raising the front end of the wagon and allowing its contents to slide out through the rear tail gate, which must be arranged for permitting this type of discharge.

It is a general object of the present invention to provide means for adapting an ordinary closed body farm wagon to the specific use of hauling grain.

Another object of the invention is to provide an improved tail gate adapted for use on any closed body farm wagon to facilitate unloading of grain without limiting the utility of the wagon for other uses.

A more specific object of the invention is to provide such a tail gate which is formed in two leaves hinged at their outer ends and meeting at the center, together with means specifically adapted to lock the leaves in the closed position, and yet to readily release them for discharge of grain.

Further objects and advantages of the invention are pointed out in the following specification, and the novel features thereof are recited with particularity in the claims. For a better understanding of the invention, its advantages and features of novelty, reference should, however, be had to the subjoined drawing, which forms a further part hereof.

In the drawing, Figure 1 is a conventional side view of a farm wagon embodying the invention;

Figure 2 is an end view of the body portion of the wagon of Figure 1;

Figure 3 is a plan view of the tail gate and adjacent portions of the wagon body; and, Figures 4, 5, 6 and 7 are views showing details of the tail gate mechanism.

Figure 4:
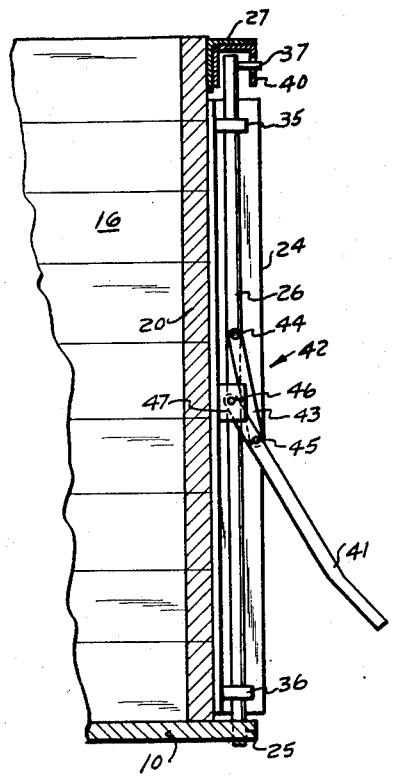

Referring now to Figure 1, there is shown a farm wagon having a floor 10, a body 11, and a undercarriage 12, including wheels 13 and a tongue 14. The body 11 has an end wall 18, side walls 15 and 16, and a tail gate generally indicated by the reference numeral 17.

As best shown in Figure 2, tail gate 17 includes left and right leaves 20 and 21, the former being hinged to the left side wall 15 of the wagon 15 by suitable means 22, and the latter being hinged to the right side wall 16 of the wagon by suitable means 23. An angle iron 24 is fastened to leaf 20 of the tail gate in such a fashion as to project therebeyond. In closing the end of the wagon, leaf 21 is swung into its closed position first, and the leaf 20 is then closed, so that angle iron 24 overlies any small space between the two leaves to seal the opening against the passage of grain. The floor of the wagon is provided with an aperture indicated at 25, and a bolt member 26 is arranged for vertical movement into and out of this aperture.

A locking bar 27, best shown in Figures 2 and 4, is pivoted to leaf 20 of the tail gate as at 30, and extends beyond leaf 20. At its outer end locking bar 27 carries a hook member 31 which is adjustable longitudinally by screw threaded means 32. Fastened to leaf 21 is a socket 33 adapted to receive the end of hook member 31. The configuration of the hook is such that when locking bar 27 is moved clockwise about its pivot 30, a wedging action occurs between the hook member and socket 33 which is effective to draw the sides of the wagon body together, thereby rendering the body more rigid and more closely sealing the body against leakage of grain.

Figure 7:
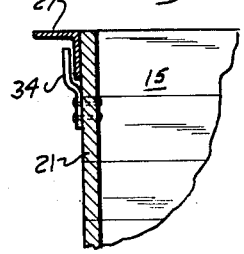

A clip 34 is provided on leaf 21 to receive the edge of locking bar 27, which may conveniently be made of angle iron. It will be appreciated that when the locking bar is in the position shown in Figures 2 and 7, movement of both leaves of the tail gate about their hinges is prevented.

Pivotal movement of locking bar 27 is brought about by bolt member 26. This member is slidable in a pair of bosses 35 and 36 mounted on angle iron 24, and carries at its upper end a transverse pin 37. This pin projects through a bracket 40 mounted on locking bar 27, and located between pivot 30 and clip 34. Thus when bolt 26 is raised, locking bar 27 pivots counter-clockwise and hook member 31 is lifted out of engagment with socket 33. Further raising of bolt member 26 disengages locking bar 27 from clip 34, and permits pivotal movement of both leaves of the tail gate about their hinges, bar 27 swinging outwardly with leaf 20.

Figure 5:
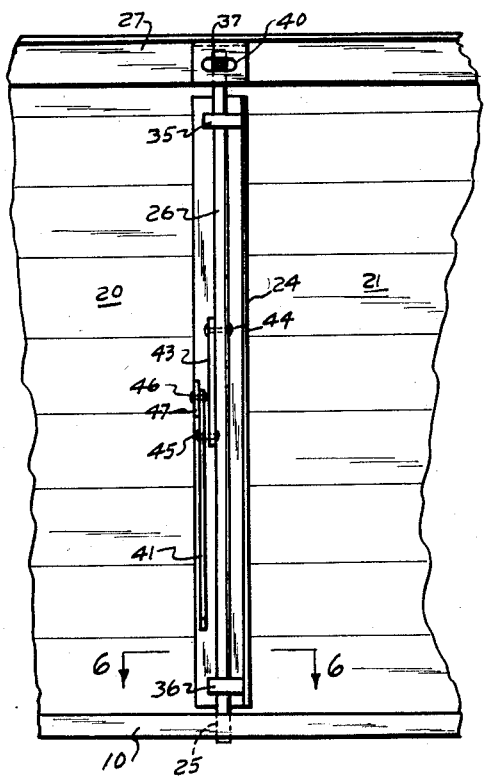
Figure 6:
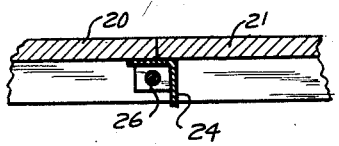

Longitudinal movement of bolt member 26 is accomplished by a lever 41 acting through an over-center locking mechanism generally indicated by the reference numeral 42 and shown in Figures 4 and 5 to include a link 43 pivoted at 44 to bolt member 26 and at 45 to lever 41. The end of lever 41 is pivoted at 46 to a bracket 47 mounted on angle iron 24. When the lever is pulled downwardly, as shown in Figure 4, bolt member 26 engages aperture 25 in the floor of the wagon, and pin 37 acts through bracket 40 to draw locking bar 27 down into clip 34, and to bring hook member 31 into wedging engagement with socket 33. When the lever is pushed upwardly, the bolt member is lifted out of the aperture 25 and hook member 31 is disengaged from socket 33.

It will be appreciated that when a wagon is loaded with grain, forces of considerable magnitude are acting to spread the body and to force the tail gate leaves to open. The wedging action of hook member 31 in socket 33 is intended to relieve much of the transverse strain on the body of the wagon, and the interaction of locking bar 27 with clip 34 and socket 33, together with the engagement between bolt member 26 and aperture 25, are designed to maintain a rigid closure of the tail gate. However, the forces acting are still large and it is readily understandable that when lever 41 is moved upwardly in the process of opening the tail gate, the force of the grain will tend to swing both gates outwardly with considerable violence, which might result in an uncontrolled flow of grain from the wagon when the tail gate is first opened. To prevent this, a chain 50 of adjustable length is connected between the right hand wall of the body and angle iron 24. By adjusting the length of this chain to a value determined by experience before operating lever 41, the initial flow of grain from the wagon when the tail gate is first opened can be limited to any desired value. When the pressure has relieved itself, the chain may be removed and the tail gate completely opened.

In the foregoing specification I have described an improved tail gate structure designed particularly for use in adapting closed body farm wagons for the hauling of grain without limiting their versatility for other purposes. The disclosure in this specification is for illustrative purposes only, however, and I may make changes, particularly in size and arrangement of parts, to the full extent of the broad language in which the appended claims are expressed.

I claim as my invention:

1. Apparatus of the class described comprising, in combination: a container having a bottom, a plurality of fixed side walls, and a further wall; means pivotally connecting one end of said further wall to one of said fixed walls; a locking bar carried on said further wall and projecting therebeyond; a socket normally receiving the projecting end of said locking bar to prevent pivotal movement of said further wall; and over-center locking means carried by said further wall and operably connected to the locking bar for actuation out of a normally locked position to move said bar so as to disengage the projecting end thereof from said socket, said locking means normally maintaining said locking bar in engagement with the socket.

2. Apparatus of the class described comprising, in combination: a container having a bottom, a plurality of fixed side walls, and a further wall; means pivotally connecting one end of said further wall to one of said fixed walls; a locking bar carried on said further wall and projecting therebeyond; a socket wedgingly receiving the projecting end of said locking bar to prevent pivotal movement of said further wall; over-center movable locking means carried by said further wall for actuation out of a normally locked position to move said bar so as to disengage the projecting end thereof from said socket; and flexible means connecting one of the fixed side walls with the free edge of said further wall and adjustable in length to limit the extent of pivotal movement of said further wall.

3. A tail gate structure comprising, in combination: first and second leaf members; means for pivoting said members about spaced parallel axes to bring adjacent edges of said members into aligned juxtaposition; a locking bar carried by the first of said members for projection therebeyond; a socket carried by the second of said members for receiving the end of said bar when said members are aligned; over-center locking means carried by said first member for actuation out of a normally locked position to move said bar so as to disengage the projecting end thereof from said socket; and flexible means connecting the hinged edge of one of said leaf members with the free edge of the other of said leaf members and adjustable in length to limit the extent of pivotal movement of said other leaf member.

4. Apparatus of the class described comprising, in combination: a wagon body having side walls and a floor; a tail gate comprising left and right leaves hinged to said body at their outer ends, and swinging into alignment to close said body; a bolt member slidable along one of said leaves to project therebeyond into a first socket, located in said floor, for preventing pivotal movement of said leaf about its hinge; a locking member pivoted to the face of said first leaf and projecting therebeyond across the face of said second leaf; a hook carried by said member and adjustable longitudinally with respect thereto; a second socket carried by said second leaf for normally receiving said hook; means connecting said bolt member to said locking member so that when said bolt member engages said first socket said hook engages said second socket; and an over-center movement locking means carried by one of the leaves and operably connected to the bolt member for actuation out of a normally locked position to move the bolt member and the locking member relative to their respective sockets, said locking means normally maintaining said members in locked engagement with said sockets.

5. Apparatus of the class described, comprising in combination: a container having a bottom, a plurality of fixed side walls and a pair of leaves forming a tail gate; means pivotally connecting one end of each of said leaves to one of the fixed side walls of the container; first and second locking bars carried by one of the leaves and projecting beyond the limits of said leaf; the second of said bars being supported for pivotal movement relative to the leaf; a first socket carried by the container bottom and normally receiving the projecting end of one of the locking bars; a second socket carried by the other leaf normally receiving the projecting end of the other locking bar to prevent pivotal movement of said leaves; and over-center movable locking means operably connected to one of said locking bars for actuation out of a normally locked position to linearly move the first locking bar relative to the first socket and pivotally move the projecting end of the second locking bar from said second socket to permit pivotal movement of the leaves.

6. Apparatus of the class described, comprising in combination: a wagon body having sides and a floor; a tail gate comprising left and right leaves hinged to said body at their outer ends and swinging into alignment to close said body; a bolt member slidable along one of said leaves to project therebeyond into a first socket, located in said floor, for preventing pivotal movement of said leaf about its hinge; a locking member pivoted to the face of said first leaf and projecting therebeyond across the face of said second leaf; a hook carried by said member; a second socket carried by said second leaf for normally receiving said hook; means connecting said bolt member to said locking member so that when said bolt member engages said first socket, said hook engages said second socket; an over-center movement locking means carried by one of said leaves and operably connected to the bolt member for actuation out of a normally locked position to move the bolt member and the locking member relative to their respective sockets; and flexible means connecting the hinged edge of one of said leaf members with the free edge of the other of said leaf members and adjustable in length to limit the extent of pivotal movement of said leaf members.

References Cited in the file of this patent

UNITED STATES PATENTS

| Number | Name | Date |
|--------|------|------|
| 126,943 | Fallick | May 21, 1872 |
| 1,573,060 | Harrison | Feb. 16, 1926 |
| 1,597,105 | Pardee | Aug. 24, 1926 |
| 1,692,726 | Estabrooks | Nov. 20, 1928 |
| 2,115,241 | Tomlinson | Apr. 26, 1938 |
| 2,429,805 | Conner | Oct. 28, 1947 |